United States Patent
De Souza et al.

(10) Patent No.: US 9,946,933 B2
(45) Date of Patent: Apr. 17, 2018

(54) SYSTEM AND METHOD FOR VIDEO CLASSIFICATION USING A HYBRID UNSUPERVISED AND SUPERVISED MULTI-LAYER ARCHITECTURE

(71) Applicant: Xerox Corporation, Norwalk, CT (US)

(72) Inventors: César Roberto De Souza, Grenoble (FR); Adrien Gaidon, Grenoble (FR); Eleonora Vig, Munich (DE); Antonio M. Lopez, Gavà (ES)

(73) Assignee: XEROX CORPORATION, Norwalk, CT (US)

( * ) Notice: Subject to any disclaimer, the term of this patent is extended or adjusted under 35 U.S.C. 154(b) by 52 days.

(21) Appl. No.: 15/240,561

(22) Filed: Aug. 18, 2016

(65) Prior Publication Data
US 2018/0053057 A1  Feb. 22, 2018

(51) Int. Cl.
*G06K 9/62* (2006.01)
*G06K 9/00* (2006.01)
*G06K 9/56* (2006.01)

(52) U.S. Cl.
CPC ..... *G06K 9/00718* (2013.01); *G06K 9/00744* (2013.01); *G06K 9/56* (2013.01); *G06K 9/6259* (2013.01); *G06K 9/6263* (2013.01)

(58) Field of Classification Search
None
See application file for complete search history.

(56) References Cited

U.S. PATENT DOCUMENTS

| | | | |
|---|---|---|---|
| 7,457,801 B2 * | 11/2008 | Liu | G06F 17/3071 |
| 8,189,866 B1 | 5/2012 | Gu et al. | |
| 8,345,984 B2 * | 1/2013 | Ji | G06K 9/4628 |
| | | | 382/103 |
| 8,447,119 B2 * | 5/2013 | Yu | G06K 9/00664 |
| | | | 382/224 |
| 8,532,399 B2 | 8/2013 | Perronnin et al. | |
| 8,731,317 B2 | 5/2014 | Sanchez et al. | |
| 8,842,965 B1 | 9/2014 | Song et al. | |

(Continued)

FOREIGN PATENT DOCUMENTS

CN       104036287 A       9/2014

OTHER PUBLICATIONS

Krizhevsky et al., "Imagenet classification with deep convolutional neural networks". In Advances in neural information processing systems, pp. 1097-1105, 2012.*

(Continued)

*Primary Examiner* — Feng Nui
(74) *Attorney, Agent, or Firm* — Fay Sharpe LLP (57) ABSTRACT

A computer-implemented video classification method and system are disclosed. The method includes receiving an input video including a sequence of frames. At least one transformation of the input video is generated, each transformation including a sequence of frames. For the input video and each transformation, local descriptors are extracted from the respective sequence of frames. The local descriptors of the input video and each transformation are aggregated to form an aggregated feature vector with a first set of processing layers learned using unsupervised learning. An output classification value is generated for the input video, based on the aggregated feature vector with a second set of processing layers learned using supervised learning.

22 Claims, 5 Drawing Sheets

(56) References Cited

U.S. PATENT DOCUMENTS

| | | | | |
|---|---|---|---|---|
| 8,942,283 | B2* | 1/2015 | Pace | G06T 9/001 375/240.1 |
| 8,964,835 | B2* | 2/2015 | Pace | G06T 9/001 375/240.08 |
| 9,058,382 | B2* | 6/2015 | Liu | G06F 17/3071 |
| 9,230,159 | B1 | 1/2016 | Vijayanarasimhan et al. | |
| 9,635,050 | B2* | 4/2017 | Di Pietro | H04L 63/1458 |
| 9,805,255 | B2* | 10/2017 | Yang | G06K 9/00335 |
| 2007/0112753 | A1* | 5/2007 | Liu | G06F 17/3071 |
| 2007/0147683 | A1* | 6/2007 | Hwang | G06K 9/00281 382/190 |
| 2009/0043764 | A1* | 2/2009 | Lu | G06F 17/3071 |
| 2011/0182352 | A1* | 7/2011 | Pace | G06T 9/001 375/240.1 |
| 2011/0182469 | A1* | 7/2011 | Ji | G06K 9/00335 382/103 |
| 2011/0229045 | A1* | 9/2011 | Yu | G06K 9/00664 382/224 |
| 2012/0045134 | A1 | 2/2012 | Perronnin et al. | |
| 2012/0076401 | A1 | 3/2012 | Sanchez et al. | |
| 2012/0155536 | A1* | 6/2012 | Pace | G06T 9/001 375/240.08 |
| 2012/0330714 | A1* | 12/2012 | Malaviya | G06Q 30/02 705/7.29 |
| 2014/0270431 | A1* | 9/2014 | Xu | G06K 9/00147 382/128 |
| 2015/0095770 | A1* | 4/2015 | Mani | G06F 17/2745 715/254 |
| 2015/0169960 | A1* | 6/2015 | Laksono | G06K 9/4652 382/170 |
| 2015/0189318 | A1* | 7/2015 | Pace | G06T 9/001 375/240.08 |
| 2015/0310308 | A1* | 10/2015 | Xiong | G06K 9/00288 382/159 |
| 2015/0363644 | A1 | 12/2015 | Wnuk et al. | |
| 2016/0028762 | A1* | 1/2016 | Di Pietro | H04L 63/1458 726/23 |
| 2016/0071024 | A1* | 3/2016 | Amer | G06N 99/005 706/12 |
| 2016/0119628 | A1* | 4/2016 | Zepeda Salvatierra | H04N 19/172 382/243 |
| 2016/0224888 | A1* | 8/2016 | Kozloski | G06N 3/04 |
| 2016/0227228 | A1* | 8/2016 | Pomeroy | H04N 9/8227 |
| 2016/0234342 | A1* | 8/2016 | Oonk | H04L 67/12 |
| 2016/0267351 | A1* | 9/2016 | Bober | H04N 19/90 |
| 2017/0109626 | A1* | 4/2017 | Gokmen | G06N 3/088 |
| 2017/0109628 | A1* | 4/2017 | Gokmen | G06N 3/088 |
| 2017/0134776 | A1* | 5/2017 | Ranjeet | H04N 21/252 |
| 2017/0220854 | A1* | 8/2017 | Yang | G06K 9/00335 |
| 2017/0236290 | A1* | 8/2017 | Sorkine Hornung | G06T 7/0081 382/173 |
| 2017/0262478 | A1* | 9/2017 | Zepeda Salvatierra | G06F 17/30271 |
| 2017/0289624 | A1* | 10/2017 | Avila | G06F 17/30817 |

OTHER PUBLICATIONS

Ciresan et al., "Multi-column deep neural networks for image classification". In Computer Vision and Pattern Recognition (CVPR), 2012 IEEE Conference on, pp. 3642-3649. IEEE, 2012.*
U.S. Appl. No. 14/691,021, filed Apr. 20, 2015, Perronnin, et al.
U.S. Appl. No. 14/714,505, filed May 18, 2015, Gaidon, et al.
U.S. Appl. No. 15/051,005, filed Feb. 23, 2016, Wang, et al.
U.S. Appl. No. 14/793,434, filed Jul. 7, 2015, Gordo Soldevila, et al.
Arandjelović, et al., "Three things everyone should know to improve object retrieval," CVPR, pp. 2911-2918 (2012).
Baccouche, et al., "Action Classification in Soccer Videos with Long Short-term Memory Recurrent Neural Networks," Proc. Int'l Conf. on Artificial Neural Networks, pp. 154-159 (2010).
Ballas, et al., "Delving Deeper into Convolutional Networks for Learning Video Representations," ICLR, pp. 1-11 (2013).
Bishop, "Generative or Discriminative? Getting the Best of Both Worlds," Bayesian Statistics, 8, pp. 3-24 (2007).
Boureau, "A Theoretical Analysis of Feature Pooling in Visual Recognition," ICML, pp. 111-118 (2010).
Bouthillier, et al., Dropout as data augmentation.ICLR 2015, arXiv: 1506.08700v4, pp. 1-11 (Jan. 2016).
Chatfield, et al., "The devil is in the details: an evaluation of recent feature encoding methods," BMVC, pp. 1-12 (2011).
Chatfield, et al., "Return of the Devil in the Details: Delving Deep into Convolutional Nets," BMVC, pp. 1-11 (2014).
Chollet, "Keras: Deep Learning library for Theano and TensorFlow," pp. 1-4 (2015), downloaded at https://github.com/fchollet/keras on May 26, 2016.
Dalal, et al., "Histograms of Oriented Gradients for Human Detection," CVPR, pp. 886-893 (2005).
Dalal, et al., "Human detection using oriented histograms of flow and appearance," ECCV, pp. 428-441 (2006).
Donahue, et al., "Long-term Recurrent Convolutional Networks for Visual Recognition and Description," CVPR, pp. 2625-2634 (2015).
Fernando, et al., "Modeling Video Evolution for Action Recognition," CVPR, pp. 5378-5387 (2015).
Gaidon, et al., "Recognizing activities with cluster-trees of tracklets," BMVC, pp. 30.1-30.13 (2012).
Gaidon, et al., "Activity representation with motion hierarchies," IJCV, 107, pp. 219-238 (2014).
Hoai, et al., "Improving Human Action Recognition using Score Distribution and Ranking," ACCV, pp. 3-20 (2014).
Ioffe, et al., "Batch Normalization: Accelerating Deep Network Training by Reducing Internal Covariate Shift," ICML, pp. 1-11 (2015).
Idrees, et al, "The THUMOS Challenge on Action Recognition for Videos 'in the Wild'," CRCV, arXiv:1604.06182v1, pp. 1-52 (2016).
Jégou, et al., "Aggregating local image descriptors into compact codes," TPAMI, 34, pp. 1704-1716 (2012).
Jain, et al. "Better exploiting motion for better action recognition," CVPR, pp. 2555-2562 (2013).
Jain, et al. "What do 15,000 object categories tell us about classifying and localizing actions?" CVPR, pp. 46-55 (2015).
Ji, et al. "3D convolutional neural networks for human action recognition," TPAMI, vol. 35, pp. 221-231 (2013).
Karpathy, et al., "Large-scale Video Classification with Convolutional Neural Networks," CVPR, pp. 1725-1732 (2014).
Kingma, et al., Adam: A Method for Stochastic Optimization, arXiv1412.6980, pp. 1-15 (2014).
Krapac, et al., "Modeling spatial layout with Fisher vectors for image categorization," ICCV, pp. 1487-1494 (2011).
Krizhevsky, et al., "Imagenet classification with deep convolutional neural networks," NIPS, pp. 1097-1105 (2012).
Kuehne, et al., "HMDB: a large video database for human motion recognition," ICCV, pp. 2556-2563 (2011).
Lan, et al., "Beyond Gaussian Pyramid: Multi-skip Feature Stacking for Action Recognition," CVPR, pp. 204-212 (2015).
Laptev, et al., "Learning realistic human actions from movies," CVPR, pp. 1-8 (2008).
Le, et al., "Learning hierarchical invariant spatio-temporal features for action recognition with independent subspace analysis," CVPR, pp. 3361-3368 (2011).
Lecun, et al., "Handwritten digit recognition with a back-propagation network," NIPS, pp. 1-9 (1989).
Maclin, et al., "An Empirical Evaluation of Bagging and Boosting," AAAI, pp. 546-551 (1997).
Marszalek, et al., "Actions in context," CVPR, pp. 2929-2936 (2009).
Nair, et al., "Rectified Linear Units Improve Restricted Boltzmann Machines," ICML, pp. 807-814 (2010).
Narayan, et al., "Hyper-Fisher Vectors for Action Recognition," arXiv1509.08439, pp. 1-7 (2015).
Ng, et al., "Beyond short snippets: Deep networks for video classification," CVPR, pp. 4694-4702 (2015).

(56) References Cited

OTHER PUBLICATIONS

Niebles, et al., "Modeling temporal structure of decomposable motion segments for activity classification," *ECCV*, pp. 392-405 (2010).
Patron-Perez, et al., "Structured Learning of Human Interaction in TV Shows," *TPAMI*, 34, pp. 2441-2453 (2012).
Patron-Perez, et al., "High Five: Recognising human interactions in TV shows," *BMVC*, pp. 1-11 (2010).
Paulin, et al., "Transformation Pursuit for Image Classification," *CVPR*, pp. 3646-3653 (2014).
Peng, et al., "Bag of Visual Words and Fusion Methods for Action Recognition: Comprehensive Study and Good Practice," arXiv1405.4506, pp. 1-22 (2014).
Peng, et al., "Action Recognition with Stacked Fisher Vectors," *ECCV*, pp. 581-595 (2014).
Perronnin, et al., "Fisher kernels on visual vocabularies for image categorization," *CVPR*, pp. 1-8 (2007).
Perronnin, et al., "Fisher Vectors Meet Neural Networks: A Hybrid Classification Architecture," *CVPR*, pp. 3743-3752 (2015).
Perronnin, et al., "Improving the Fisher Kernel for Large-Scale Image Classification," *ECCV*, pp. 143-156 (2010).
Russakovsky, et al., "ImageNet Large Scale Visual Recognition Challenge," *IJCV*, vol. 115(3), pp. 211-252 (2015).
Sanchez, et al., "Image Classification with the Fisher Vector: Theory and Practice," International Journal of Computer Vision (IJCV) 105(3): 222-245 (2013).
Sanchez, et al., "Modeling the Spatial Layout of Images Beyond Spatial Pyramids," *Pattern Recognition Letters*, vol. 33(16), pp. 2216-2223 (2012).
Simonyan, et al., "Two-Stream Convolutional Networks for Action Recognition in Videos," *NIPS*, pp. 568-576 (2014).
Soomro, et al., "UCF101: A dataset of 101 human actions classes from videos in the wild," arXiv:1212.0402, pp. 1-7 (2012).
Srivastava, et al., "Dropout: A Simple Way to Prevent Neural Networks from Overfitting," *J. Machine Learning Research*, 15, pp. 1929-1958 (2014).
Srivastava, et al., "Unsupervised Learning of Video Representations using LSTMs," arXiv:1502.04681, pp. 1-10 (2015).
Sun, et al., "Human Action Recognition using Factorized Spatio-Temporal Convolutional Networks," *ICCV*, pp. 4597-4605 (2015).
"The First International Workshop on Action Recognition with a Large Number of Classes," pp. 1-3 2013), downloaded on Aug. 9, 2016 from: http://crcv.ucf.edu/ICCV13-Action-Workshop/download.html.
Tran, et al., "Learning Spatiotemporal Features with 3D Convolutional Networks," *CVPR*, pp. 4489-4497 (2014).
Uijlings, et al., "Video classification with Densely Extracted HOG/HOF/MBH features: an evaluation of the accuracy/computational efficiency trade-off," Int. J. Multimed. Info. Retr., pp. 1-13 (2014).
Vrigkas, et al., "A Review of Human Activity Recognition Methods," *Frontiers in Robotics and AI*, vol. 2, Article 28, pp. 1-28 (2015).
Wang, et al., "Action recognition by dense trajectories," *CVPR*, pp. 3169-3176 (2011).
Wang, et al., "Dense trajectories and motion boundary descriptors for action recognition," *IJCV*, 103 (1), pp. 60-79 (2013).
Wang, et al., "A robust and efficient video representation for action recognition," *IJCV*, pp. 1-20 (2015).
Wang, et al., "Action Recognition with Improved Trajectories," *ICCV*, pp. 3551-3558 (2013).
Wang, "LEAR-INRIA submission for the THUMOS workshop," *ICCV workshop on action recognition with a large number of classes*, pp. 1-3 (2013).
Wang, et al., "Action Recognition with Trajectory-Pooled Deep-Convolutional Descriptors," *CVPR*, pp. 4305-4314 (2015).
Wu, et al., "Fusing Multi-Stream Deep Networks for Video Classification," arXiv:1509.06086, pp. 1-9 (2015).
Wu, et al., "Modeling Spatial-Temporal Clues in a Hybrid Deep Learning Framework for Video Classification," *ACM-MM*, pp. 461-470 (2015).
Zha, et al., "Exploiting Image-trained CNN Architectures for Unconstrained Video Classification," *BMVC*, pp. 1-9 (2015).
Zhou, et al., "Ensembling Neural Networks: Many Could Be Better Than All," *Artificial Intelligence*, 137, pp. 239-263 (2002).

\* cited by examiner

SYSTEM AND METHOD FOR VIDEO CLASSIFICATION USING A HYBRID UNSUPERVISED AND SUPERVISED MULTI-LAYER ARCHITECTURE

BACKGROUND

The following relates to video camera-based systems to video classification, processing and archiving arts, and related arts and finds particular application in connection with a system and method for generating a representation of a video which can be used for classification.

Video classification is the task of identifying the content of a video by tagging it with one or more class labels that best describe its content. Action recognition can be seen as a particular case of video classification, where the videos of interest contain humans performing actions. The task is then to label correctly which actions are being performed in each video, if any. Classifying human actions in videos has many applications, such as in multimedia, surveillance, and robotics (Vrigkas, et al. "A review of human activity recognition methods," Frontiers in Robotics and AI 2, pp. 1-28 (2015), hereinafter, Vrigkas 2015). Its complexity arises from the variability of imaging conditions, motion, appearance, context, and interactions with persons, objects, or the environment over time and space.

Existing algorithms for action recognition are often based on statistical models learned from manually labeled videos. They use models relying on features that are hand-crafted for action recognition or on end-to-end deep architectures, such as neural networks. These approaches have complementary strengths and weaknesses. Models based on hand-crafted features are data efficient, as they can easily incorporate structured prior knowledge (e.g., the relevance of motion boundaries along dense trajectories (Wang, et al., "Action recognition by dense trajectories," CVPR, (2011), hereinafter, Wang 2011). However, their lack of flexibility may impede their robustness or modeling capacity. Deep models make fewer assumptions and are learned end-to-end from data (e.g., using 3D-ConvNets (Tran, et al., "Learning spatiotemporal features with 3D convolutional networks," CVPR, (2014), hereinafter, Tran 2014). However, they rely on handcrafted architectures and the acquisition of large manually labeled video datasets (Karpathy, et al., "Large-scale video classification with convolutional neural networks," CVPR, (2014), a costly and error-prone process that poses optimization, engineering, and infrastructure challenges.

There remains a need for a system and method that provides improved results for video classification.

INCORPORATION BY REFERENCE

The following references, the disclosures of which are incorporated herein by reference in their entireties, are mentioned:

US Pub. No. 2012/0076401, published Mar. 29, 2012, entitled IMAGE CLASSIFICATION EMPLOYING IMAGE VECTORS COMPRESSED USING VECTOR QUANTIZATION, by Sanchez, et al.

U.S. Pat. No. 8,731,317, issued May 20, 2014, entitled IMAGE CLASSIFICATION EMPLOYING IMAGE VECTORS COMPRESSED USING VECTOR QUANTIZATION, by Sanchez, et al.

U.S. Pat. No. 8,842,965, issued Sep. 23, 2014, entitled LARGE SCALE VIDEO EVENT CLASSIFICATION, by Song, et al.

U.S. Pat. No. 8,189,866, issued May 29, 2012, entitled HUMAN-ACTION RECOGNITION IN IMAGES AND VIDEOS, by Gu, et al.

US Pub. No. 20150363644, entitled ACTIVITY RECOGNITION SYSTEMS AND METHODS, published Dec. 17 2015, by Wnuk, et al.

U.S. application Ser. No. 14/691,021, filed Apr. 20, 2015, entitled FISHER VECTOR MEET NEURAL NETWORKS: A HYBRID VISUAL CLASSIFICATION ARCHITECTURE, by Perronnin, et al., and Perronnin, et al., "Fisher vectors meet neural networks: A hybrid classification architecture,". CVPR (2015), hereinafter, collectively Perronnin 2015.

BRIEF DESCRIPTION

In accordance with one aspect of the exemplary embodiment, a video classification method includes receiving an input video including a sequence of frames. At least one transformation of the input video is generated, each transformation including a sequence of frames. For the input video and each transformation, local descriptors are extracted from the respective sequence of frames. The local descriptors of the input video and each transformation are aggregated to form an aggregated feature vector with a first set of processing layers learned using unsupervised learning. An output classification value is generated for the input video, based on the aggregated feature vector with a second set of processing layers learned using supervised learning.

One or more of the steps of the method may be implemented by a processor.

In accordance with another aspect, a system for classifying a video includes a transformation generator which generates at least one transformation of an input video comprising a sequence of frames, each transformation comprising a sequence of frames. A feature vector generator extracts local descriptors from the respective sequence of frames for the input video and each transformation and aggregates the local descriptors of the input video and each transformation to form an aggregated feature vector with a first set of processing layers learned using unsupervised learning. A classifier component generates an output classification value for the input video based on the aggregated feature vector with a second set of processing layers learned using supervised learning. A processor implements the transformation generator, feature vector generator and classifier component.

In accordance with another aspect, a method for classifying a video includes receiving an input video. A plurality of transformations of the input video is generated. For each transformation, a feature vector representing the transformation is generated. The generating includes, for a plurality of frames of the transformation, extracting local descriptors from the plurality of frames of the transformation of the input video. A plurality of spatio-temporal features from the plurality of transformations of the input video is extracted. The extracted spatio-temporal features are stacked into a matrix. The matrix is encoded. The encodings of the matrix are pooled to generate an encoding vector. The encoding vector is normalized. The generated feature vectors of the input video and at least one of the transformations and the encoding vector are aggregated to form an aggregated feature vector. With a trained classifier, an output classification value is generated for the input video, based on the aggregated feature vector.

One or more of the steps of the method may be implemented by a processor.

DETAILED DESCRIPTION

The exemplary embodiment relates to a system and method for generating a multidimensional representation of a video which is suited to use in classification of videos, based on a hybrid unsupervised and supervised deep multi-layer architecture.

The system and method find particular application in action recognition in videos.

The exemplary hybrid video classification system is based on unsupervised representations of spatio-temporal features classified by supervised neural networks. The hybrid model is both data efficient (it can be trained on 150 to 10000 short clips), and makes use of a neural network model which may have been previously trained on millions of manually labeled images and videos.

A hybrid architecture combining unsupervised representation layers with a deep network of multiple fully connected layers can be employed. Supervised end-to-end learning of a dimensionality reduction layer together with non-linear classification layers yields a good compromise between recognition accuracy, model complexity, and transferability of the model across datasets due, in part, to reduced risks of overfitting and optimization techniques.

Data augmentation is employed on the input video to generate one or more transformations that do not change the semantic category (e.g., by frame-skipping, mirroring, etc., rather than simply by duplicating frames). Feature vectors extracted from the transformation(s) are aggregated ("stacked"), a process referred to herein as Data Augmentation by Feature Stacking (DAFS). The stacked descriptors form a feature matrix, which is then encoded. The resulted encodings are pooled to generate Spatio-temporal descriptors. As used herein, these are descriptors extracted from two or more frames of a video, which reflect a predicted change in position (trajectory) of the pixels from which the features are extracted.

Normalization may be employed to obtain a single augmented video-level representation.

The exemplary DAFS method is particularly suited to a Fisher Vector (FV)-based representation of videos as pooling FV from a much larger set of features decreases one of the sources of variance for FV (Boureau, et al., "A theoretical analysis of feature pooling in visual recognition," ICML, (2010)). However, other representations of fixed dimensionality are also contemplated.

The exemplary hybrid architecture includes an initial set of unsupervised layers followed by a set of supervised layers. The unsupervised layers are based on the Fisher Vector representation extraction of dense trajectory features obtained after data-augmentation, followed by optional unsupervised dimensionality reduction. The supervised layers are based on the processing layers of a multi-layer neural network.

Figure 1:
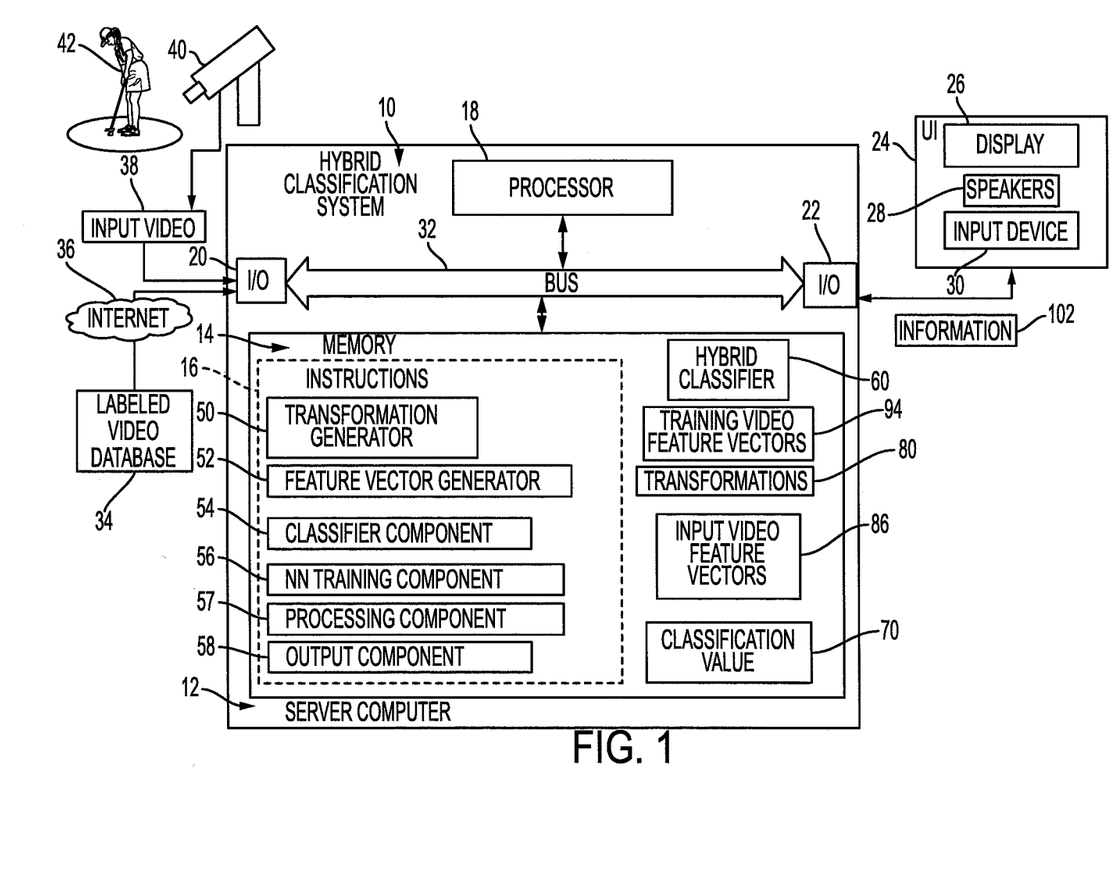
FIG. 1 diagrammatically shows a hybrid classification system in accordance with one aspect of the exemplary embodiment.

With reference to FIG. 1, an illustrative embodiment of a hybrid classification system 10 is shown. The hybrid classification system is implemented by a computer 12 or other electronic data processing device that is programmed to perform the disclosed video classification operations. It will be appreciated that the disclosed video classification approaches may additionally or alternatively be embodied by a non-transitory storage medium storing instructions readable and executable by the computer 12 or other electronic data processing device to perform the disclosed video classification employing a hybrid architecture.

As shown in FIG. 1, the illustrated computer implemented system 10 includes memory 14, which stores instructions 16 for performing the exemplary method, and a processor 18, in communication with the memory 14, which executes the instructions. In particular, the processor 18 executes instructions for performing the classification methods outlined in FIG. 3 and/or FIG. 4. The processor 18 may also control the overall operation of the computer system 12 by execution of processing instructions which are stored in memory 14. The computer 12 also includes a network interface 20 and a user input/output interface 22. The I/O interface 22 may communicate with a user interface 24 which may include one or more of a display device 26, for displaying information to users, speakers 28, and a user input device 30 for inputting text and for communicating user input information and command selections to the processor, which may include one or more of a keyboard, keypad, touch screen, writable screen, and a cursor control device, such as mouse, trackball, or the like. The various hardware components 14, 18, 20, 22 of the computer 12 may be all connected by a bus 32. The system may be hosted by one or more computing devices, such as the illustrated server computer 12.

The system has access to a database 34 of labeled training videos, which may be stored in memory 14 or accessed from a remote memory device via a wired or wireless link 36, such as a local area network or a wide area network, such as the internet. The system receives as input a video 38 for classification, e.g., acquired by a video camera 40. The camera may be arranged to acquire a video of a person 42 or other moving object to be classified. Each of the training videos and the input video includes a sequence of frames (images) captured at a sequence of times.

The computer 12 may include one or more of a PC, such as a desktop, a laptop, palmtop computer, portable digital assistant (PDA), server computer, cellular telephone, tablet computer, pager, combination thereof, or other computing device capable of executing instructions for performing the exemplary method.

The memory 14 may represent any type of non-transitory computer readable medium such as random access memory (RAM), read only memory (ROM), magnetic disk or tape, optical disk, flash memory, or holographic memory. In one embodiment, the memory 14 comprises a combination of random access memory and read only memory. In some embodiments, the processor 18 and memory 14 may be combined in a single chip. The network interface 20 allows the computer to communicate with other devices via a computer network, such as a local area network (LAN) or wide area network (WAN), or the internet, and may comprise a modulator/demodulator (MODEM) a router, a cable, and and/or Ethernet port. Memory 14 stores instructions for performing the exemplary method as well as the processed data.

The digital processor 18 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The hybrid classification system 10 includes a transformation generator 50, a feature vector generator 52, a classifier component 54, a neural network training component 56, an optional processing component 57, and an output component 58.

Figure 2:
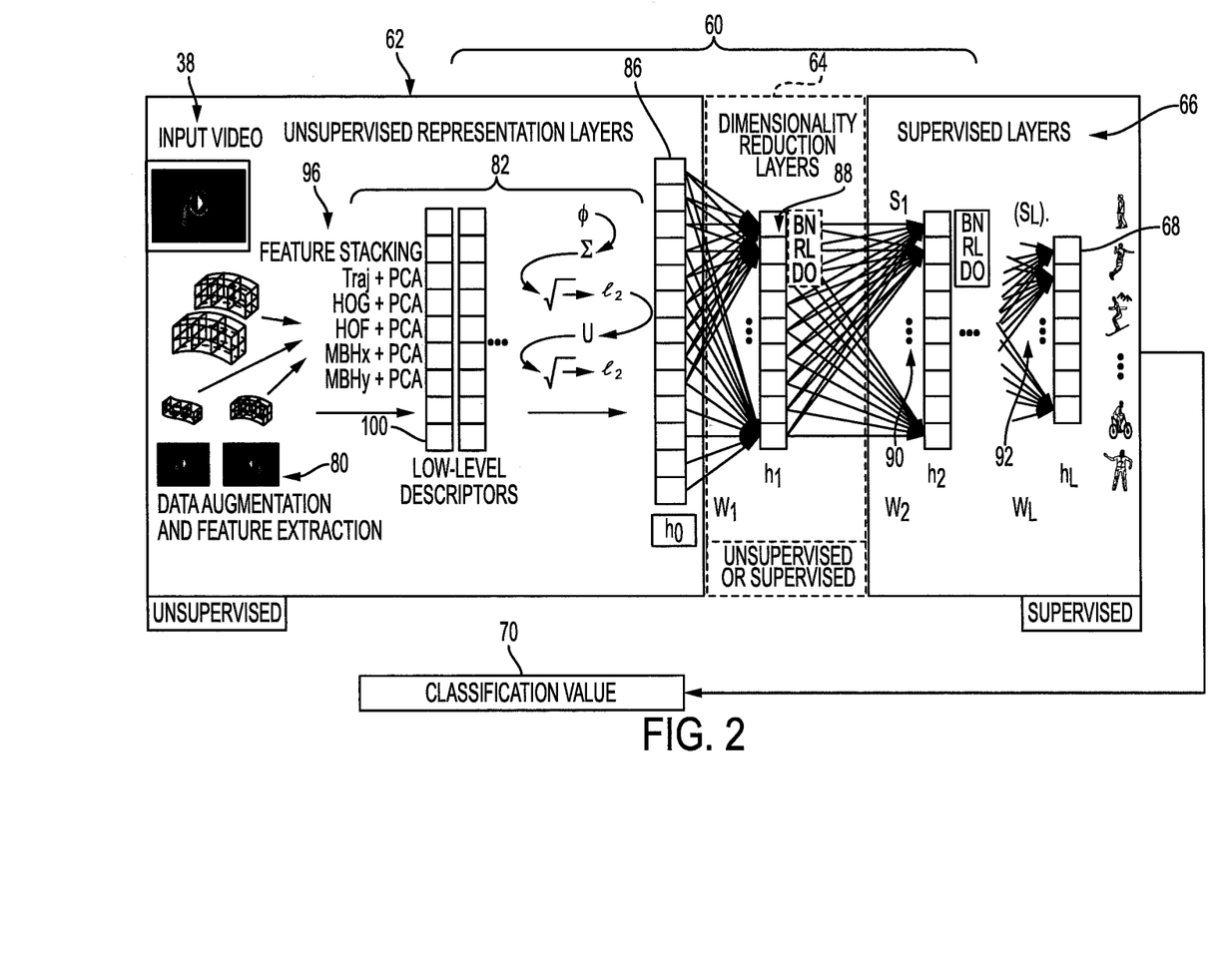
FIG. 2 diagrammatically shows a classification model of the hybrid classification system in accordance with one aspect of the exemplary embodiment.

The functions of the feature vector generator 52 may be incorporated into a hybrid classifier 60, as shown in FIG. 2. The hybrid classifier includes unsupervised and unsupervised parts, in particular, a first set of unsupervised representation generation layers 62 learned in an unsupervised manner, optionally, a dimensionality reduction layer or layers 64, which may be supervised or unsupervised, and a second set of supervised layers of a neural network (NN) 66. The layers 62, 64, 66, form a sequence, with the output of one layer serving as the input of the next layer. The output of the last layer of the neural network 66 is a representation 68 which, for each of a finite set of classes includes a value representative of the probability that the video should be labeled with that class. The representation 68 may be output or used to provide a classification value 70.

As illustrated in FIG. 2, the transformation generator 50 performs data augmentation by generating a set of transformations 80 from the input video 38, each transformation including a sequence of frames, such as at least 10 or at least 50 frames. The transformations may include one or more of repeating frames of the input video (e.g., repeating every second, third, or fourth frame), skipping frames of the input video (e.g., skipping every second, third, or fourth frame), color modifications to the input video, and translating frames of the input video (such as through rotation, creating a mirror image, horizontally and/or vertically, or shifting the frame by a selected number of pixels in one or more directions).

The feature vector generator 52 performs unsupervised operations 82 on the input video 38 and transformations 80 to generate a multidimensional representation 86 in the form of an aggregated feature vector $h_0$, representing the input video 38 (and its transformations). The representation 86 may be reduced in dimension by layers 64 to generate a dimensionality-reduced representation 88 of the input video. The representation 88 (or 86) is input to the neural network 66 which includes an ordered sequence of supervised operations, i.e., layers 90, 92, etc. Only two layers of the NN are shown by way of illustration, however, it is to be appreciated that several layers may be employed, such as three, four, five, or more layers, that receive the output of the previous layer as input. Each layer 64, 90, 92 is parameterized by respective sets of weights $W_1, W_2, \ldots, W_L$.

The NN training component 56 trains the supervised layers 90, 92 of the NN 66 on representations 94 generated from the set of labeled training videos 34. In the illustrative embodiment, the set of labeled training videos includes a database of videos, each labeled to indicate a video type using a classification scheme of interest (such as, by way of example, a classification scheme including the following classes: "playing a sport," "talking," "driving a car," etc.) In addition or alternatively, the input videos 38 can be further classified based on the initial classification (e.g., "playing sports" videos can be further classified as "basketball," "running," "swimming," "cycling," and the like). In another embodiment, the classes could be more general such as "one person," "more than one person," and so forth. More particularly, the supervised layers 90, 92 are trained by the NN training component 56 operating on a set of training video feature vectors 94, generated by the feature vector generator analogously to vector 86 (or 88) representing the training videos 34, wherein the training video feature vectors are generated by applying the unsupervised operations 80, 82 to each training video, without employing the labels. The Neural Network 66 may be a pre-trained Neural Network, having been previously trained on a large collection of videos and/or images or representations thereof, which need not have been generated in the same way as vectors 86 (or 88). The training component 56 then updates the weights of the existing neural network, e.g., by backpropagation of errors. The errors are computed between the output vector 68 for the training video 34 and the actual label of the training video (converted to a vector analogous to vector 68 in which every feature has a value of zero, except for the true label(s)).

The set of training videos 34 suitably include a set of training videos of, for example, "playing golf," "playing basketball," "talking," "driving a car," with the labels of the training videos suitably being labels of the videos by the training videos in the chosen classification scheme (e.g., chosen from classes: "playing golf," "playing basketball," "talking," "driving a car," etc.). The labels may, for example, be manually annotated labels added by a human annotator. Each video may include a single label or multiple labels.

The illustrative unsupervised operations 82 include a feature extraction step in which trajectory video features 96 that efficiently capture appearance, motion, and spatio-temporal statistics, such as trajectory shape (traj) descriptors (Wang 2011), Histograms of Oriented Gradients (HOG) descriptors (Dalai, et al., "Histograms of oriented gradients for human detection," CVPR (2005), histogram of optical flow (HOF) (Dalai, et al., "Human detection using oriented histograms of flow and appearance," ECCV. (2006), and motion boundary histograms (MBH) such as MBHx and MBHy, (Wang 2011). These descriptors are extracted along trajectories obtained by median filtering dense optical flow. Improved dense trajectories (iDT) may be extracted, as described in Wang, et al., "Action recognition with improved trajectories," ICCV (2013), hereinafter, Wang 2013-1. The trajectory descriptors may be generated by tracking the movement of individual pixels (or a group of adjacent pixels) in a sequence of frames of the video over time (referred to as the optical flow). Based on the trajectory, a window is extracted from each frame. The window may include the predicted positions of the pixels and a small region around them. Descriptors are extracted from the set of windows along this trajectory, which are aggregated into a single trajectory-level descriptor 96. Other descriptors may be extracted, such as shape descriptors, texture descriptors, Scale-Invariant Feature Transform (SIFT) descriptors and color descriptors, from at least one frame of the corresponding transformation 80. Each category of descriptors can be denominated a "descriptor channel". A "descriptor channel" refers to the collection of all descriptions of the same type coming from the same video. For example, one descriptor channel is the collection of all SIFT descriptors in the video, another descriptor channel is the collection of all HOG descriptors in the video, etc. As an example, at least three or at least four descriptor channels may be employed In another embodiment, as an alternative or in addition to extraction of such visual features based on the pixels if the frames, audio data associated with the frames is used for feature extraction. Mel-frequency cepstral coefficients (MFCC) features are one example of audio features. As with the visual features transformations can be generated from the audio data in a similar manner.

The local descriptors 96 of the original video 34 and its transformations 80 are aggregated to form a fixed length vector 86. The following process is given as an example.

The local descriptors in each descriptor channel of the videos and its transformations 96 may be normalized, e.g., with RootSIFT. This process entails $l_1$ normalization, followed by component-wise square-rooting, and an $l_2$ normalization of the result. The descriptors of the original video are then stacked together with the descriptors from the same descriptor channel in the transformed videos to form a single matrix (at this stage, the descriptors in a descriptor channel from the original video could be stacked with the descriptors from the same descriptor channel in the other transformations of the video) and optionally augmented with their (x,y,t) coordinates, to form low level descriptors 100. The descriptors may be projected to a new feature space of reduced dimensionality, e.g., with Principal Component Analysis (PCA). At this stage, the descriptors in a descriptor channel from the original video could be stacked with the descriptors from the same descriptor channel in the other transformations of the video.

The projected descriptors 100 are then aggregated as a "Bag-of-(Visual) Words (BOW) and converted to a fixed length vector $\phi$ using, for example, Fisher Vector (FV), Vector of Locally Aggregated Descriptors (VLAD), or other encoding. See, for example, J. Uijlings, et al., "Video classification with Densely Extracted HOG/HOF/MBH features: an evaluation of the accuracy/computational efficiency trade-off," Int. J. Multimed. Info. Retr. (2014). In the case of Fisher Vectors, it is assumed that a generative model exists (such as a Gaussian Mixture Model (GMM)) from which descriptors of image patches are emitted, and the Fisher Vector components are the gradient of the log-likelihood of the descriptor with respect to one or more parameters of the model. Each patch used for training can thus be characterized by a vector of weights, one (or more) weight(s) for each of a set of Gaussian functions forming the mixture model. Given a new video, a representation can be generated (often called a video signature) based on the characterization of its patches with respect to the trained GMM. Methods for computing Fisher Vectors are described, for example, in U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sanchez, et al., U.S. Pub. No. 20120045134, published Feb. 23, 2012, entitled LARGE SCALE IMAGE CLASSIFICATION, by Florent Perronnin, et al., Jorge Sanchez, et al., "High-dimensional signature compression for large-scale image classification," in CVPR 2011, Jorge Sanchez and Thomas Mensink, "Improving the fisher kernel for large-scale image classification," Proc. 11th European Conference on Computer Vision (ECCV): Part IV, pp. 143-156 (2010), Jorge Sanchez, et al., "Image Classification with the Fisher Vector: Theory and Practice," International Journal of Computer Vision (IJCV) 105(3): 222-245 (2013). As shown in these references, square-rooting and L2-normalizing of the FV can greatly enhance the classification accuracy.

The fixed length vectors $\phi$ that are statistically representative of the descriptor channel in a video are separately aggregated $\Sigma$ into a video-level representation, square rooted, and $l_2$ normalized (the feature vectors of each of the transformations have already been merged together at this stage). The FV encodings of each descriptor channel are aggregated u, e.g., concatenated, to produce a video-level representation that may be normalized by square-rooting and $l_2$-normalization (which are also unsupervised operations). The resulting (aggregated) FV 86 is input to layer 64 for dimensionality reduction.

The ordered sequence of supervised layers of the illustrative NN 66 of FIG. 2 are designated without loss of generality as layers $(s_1), (s_2), \ldots (s_L)$. The number of supervised layers is in general L≥2, and in some embodiments the number of supervised layers is L≥4. Each illustrative non-final supervised layer $(s_1), (s_2), \ldots (s_{L-1})$ may include a linear projection followed by a non-linear transform, such as a Rectified Linear Unit (reLU). The last supervised layer $(s_L)$ may include a linear projection followed by a non-linear transform, such as a softmax or a sigmoid function, and produces the label estimates 68, i.e., a set of classification values. This illustrative hybrid architecture is a deep architecture which stacks several unsupervised and supervised layers. While illustrative FIG. 2 employs only spatio-temporal descriptors, in other embodiments other low level descriptors of the frames, such as color descriptors, gradient (e.g., SIFT) may additionally or alternatively be employed, forming distinct descriptor channels.

The last supervised layer $S_L$ outputs the label estimates 68 $h$. An output classification value 70 (or other classification value, depending on the classification scheme) represents the classification of the video, e.g., what the person or object in the input video is doing). The output classification value 70 may be the vector of label estimates $h_L$ 68 produced by the last layer $s_L$ of the NN 66, or the classification value 70 may be generated by further processing of the label estimates vector $h_L$—for example, such further processing may include selecting the label having the highest label estimate in the vector $h_L$ as the classification value 70 (here the classification value 70 may be a text label, for instance), or applying thresholding to the label estimates of the vector $h_L$ to produce a sub-set of labels for the actions, or so forth in the input video 38.

In some embodiments the processing component 57 performs an operation on the label estimates 68. For example, the processing component may compare the vector 68 with a corresponding vector generated for at least one other video, e.g., computes a similarity measure, such as a cosine distance between the two vectors. A threshold may be established on similarity to determine if two videos are similar or the similarity measure may be output. In some embodiments, the similarity measure may be used to retrieve similar videos from a database of videos. This may be employed in a recommender system, for example, to suggest similar videos. In another embodiment, videos are clustered based on their representations 68.

The output component 58 outputs the classification value 68 or 70, or information 102 generated therefrom, such as the identifier of a similar video or a cluster of similar videos computed by the processing component 57.

Figure 3:
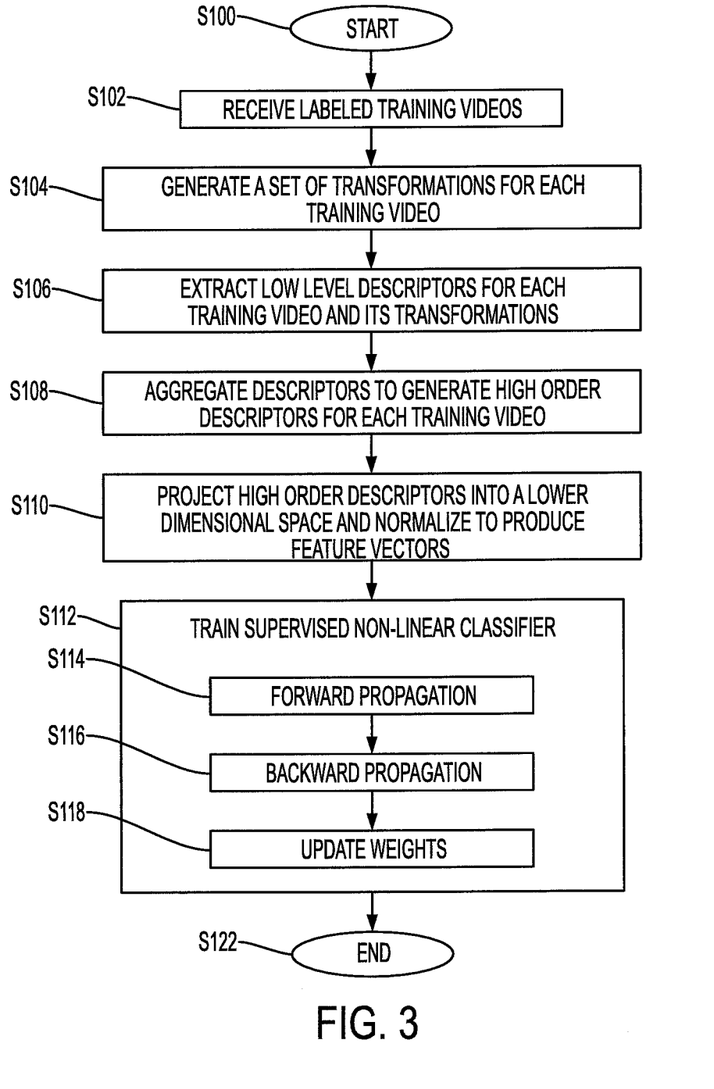
FIG. 3 shows a flowchart of a training process for training the classification model of FIG. 2 in accordance with another aspect of the exemplary embodiment.

With reference to FIG. 3, a method of training the hybrid classifier model 60 is described. The method begins at S100. At S102, labeled training videos are received. These may be clips from longer videos. At S104, for each training video, a set of transformed videos is generated, such as at least 2, 3, 4, 5, 6, or more different transformed videos, or up to 20, or up to 10 transformed videos.

At S106, for each transformation 80 and the original training video 34, low level descriptors are extracted. This is repeated for each training video of the set of training videos 34. This is an unsupervised operation, performed in the same manner as for the input video 38.

At S108, statistical aggregation is applied to generate a higher order descriptor for each training video, which aggregates the descriptors generated for the input training video and its transformations. In some examples, the operation S108 can include extracting a plurality of spatio-temporal features (e.g., position of an object, time of an object, and so forth) from the transformations of the input video 38. The extracted features are stacked into a matrix, and then the matrix is encoded. The encoded matrices are pooled to generate an encoding vector, which may then be normalized to obtain a single output vector 86.

While a FV framework is employed in the illustrative method, in other embodiments other generative models may be used to encode the local descriptors, and the resulting encoded descriptors are aggregated, e.g., concatenated to form a video-level feature vector. PCA/whitening or another dimensionality reducing technique can be used to project higher order descriptors into a lower dimensional space, with low inter-dimensional correlations as is provided by PCA. Each of the operations optionally also includes normalization, such as an $l_2$-normalization.

At S110, the aggregated feature vector 94 may be passed through one or more dimensionality reduction layers 64 to generate a representation of the same dimensionality as the representations used for pre-training of the neural network.

At S112, the resulting training video feature vectors are then used in a NN training operation. The training updates the supervised layers $s_1, \ldots, s_L$ for each iterative pass of the training. The training optimizes the adjustable weights $W_1$, $W_2$, etc. of the neurons to minimize the error between the true label, expressed as a vector, and the output of the last layer 94 of the neural network. The illustrative neural network trainer 56 employs a typical backpropagation neural network training procedure, which iteratively applies: a forward propagation step S114 that generates the output activations at each layer, starting from the first layer and finishing with the last layer; a backward propagation step S116 that computes the gradients, starting from the last layer and finishing with the first layer; and an update step S118 that updates the weight parameters of each layer of the NN 66. The method may return from S118 to S114 for one or more iterations, such as at least 100 iterations. The supervised layers $s_1, \ldots, s_L$ may be followed by Batch-Normalization (BN), ReLU (RL) non-linearities, and Dropout (DO) during training.

The training method ends at S120.

Figure 4:
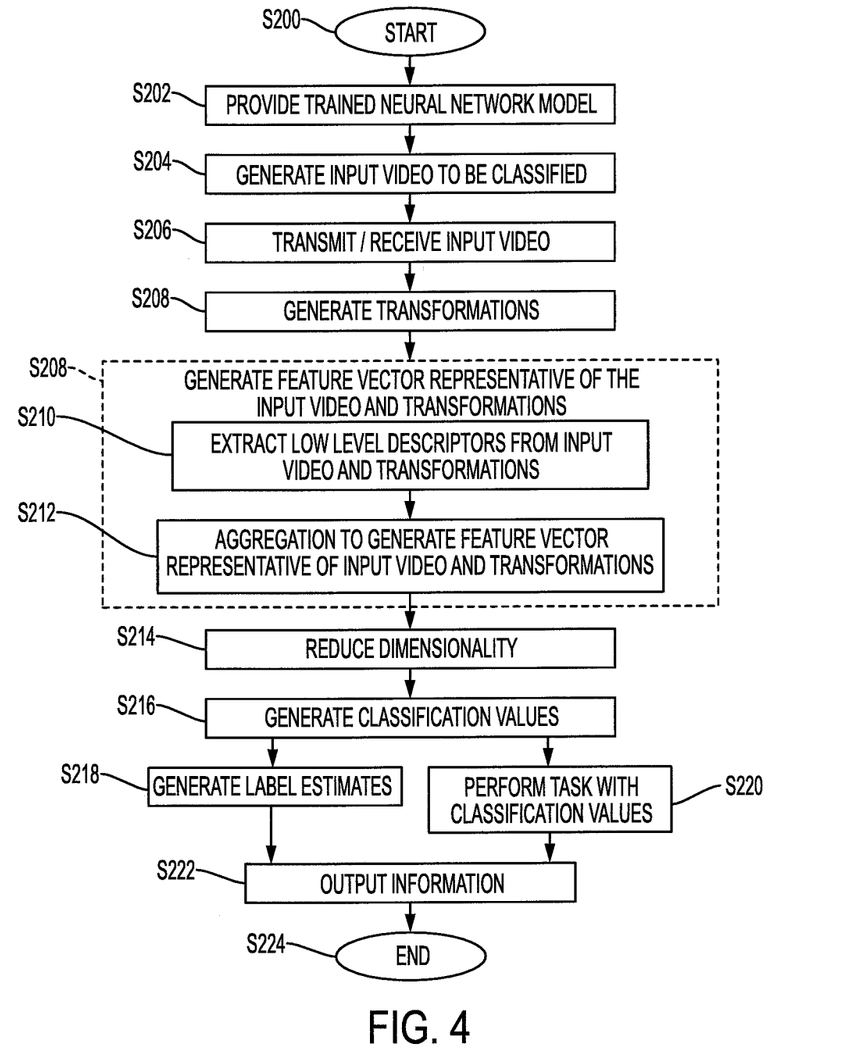
FIG. 4 shows a flowchart of a video classification process performed using the classification model of FIG. 2 after training in accordance with the training process of FIG. 3 in accordance with another aspect of the exemplary embodiment.

With reference to FIG. 4, a method for generating a classification value is described. The method begins at S200. A trained neural network 66, is provided, e.g., as described in FIG. 3. At S202, an input video 38 is generated, e.g., by a video camera 36. At S204, the input video 38 is transmitted to and is received by the system 10, and may be stored in memory 14 during processing. At S206, at least one transformation 80 of the input video 38, by the transformation generator 50. The input video includes a sequence of frames. In some embodiments, the at least one transformation includes a plurality of transformations. The transformation(s) are applied to a plurality of the frames. In some embodiments, a given transformation is applied to fewer than all frames. The transformation(s) can include at least one of: repeating frames of the input video 38, skipping frames of the input video 38, color modifications to the input video 38, translating frames of the input video 38, cropping frames of the input video, projective transformations of the frames of the input video, affine transformations of the frames of the input video, and so forth. In the exemplary embodiment, at least two, or at least three, or at least four of these different types of transformation are performed. Combinations of transformations may be performed.

At S208, a multi-dimensional feature vector that is representative of the original video and its corresponding transformation(s) is generated, by the feature vector generator 52.

S208 may include the following sub-steps:

At S210, local descriptors are generated for each transformation. The local descriptors are each representative of only a sub-part of a frame or sequence of frames. The local descriptors may be sampled along an optical flow trajectory identified from the plurality of frames. Example types of local descriptors that may be extracted include Traj descriptors, HOG descriptors, HOF descriptors, and MBH, such as MBHx and MBHy.

At S212, the generated feature vectors for the input video and the corresponding transformations are converted to fixed length vectors, e.g. Fisher Vectors, and aggregated to form an aggregated feature vector 86, in the same manner as for the training videos (S108).

At S214, the dimensionality of the feature vector 86 may be modified further for input into the neural network, e.g., by the feature vector generator 52.

At S216, the aggregated feature vector 86 is input to the NN model 66. The NN 66, having been previously trained to generate classification values for the input video, outputs classification values 68 for the input video based on the aggregated feature vector. For example, the output classification values can correspond to similar classification labels as the training videos (e.g., "driving a car," "talking," "playing basketball" and so forth).

In particular, the feature vector 88 is passed through the feed-forward NN architecture. The ordered sequence of supervised layers $s_1, \ldots, s_L$ is applied in sequence, starting with layer $s_1$ and continuing through to layer $S_L$, which outputs label estimates 68 (corresponding to the vector $x_L$ of FIG. 2). This corresponds to the forward propagation step of the neural network training of FIG. 3 and is performed using the optimized neuron weights output by the neural network training.

The label estimates 68 may be the final classification value output by the system. In another embodiment, at S218, an additional post-classifier operation may be performed to generate the classification value. For example, S218 may include selecting the label having the highest label estimate, or applying thresholding to the label estimates to select a sub-set of highest-ranked labels, or so forth.

In another embodiment, at S220, the classification values 68 may be used, by the processing component 57, to perform a further task, such as computing similarity between two or more videos based on their classification values, to cluster a set of videos, or the like.

At S220, information 102 is output by the output component 58. The output information may include one or more of the classification value(s) 68, 70 and the output of S218, such as a set of one or more most similar videos or a set of video clusters including one or more clusters of videos.

The method ends at S224.

Further details of the system and method will now be provided.

The exemplary hybrid action recognition model 60 combining FV with neural networks starts a set of unsupervised layers. The unsupervised layers, may be learned with one GMM of at least 64 Gaussians, such as at least 128 Gaussians, e.g., 256 Gaussians per descriptor channel using EM on a set of at least 5000, such as at least 50,000 trajectories, or about 256,000 trajectories randomly sampled from the pool of training videos.

The next part of the architecture includes a set of L fully-connected supervised layers, each including a dot-product followed by a non-linearity. Let $h_o$ denote the FV output from the last unsupervised layer in the hybrid architecture, $h_j-1$ the input of layer $j\in\{1,\ldots L\}$, $h_j=g(W_j h_j-1)$ its output, where $W_j$ is the corresponding parameter matrix to be learned. The biases are omitted from the equations for better clarity. For intermediate hidden layers $h_o$, $h_1$, $h_{L-1}$, a Rectified Linear Unit (ReLU) non-linearity is used for g (see, e.g., Nair, et al., "Rectified linear units improve Restricted Boltzmann Machines," ICML, pp. 807-814 (2010)). For the final output layer $h_L$, different non-linearity functions may be used, depending on the task. For multi-class classification over c classes, the softmax function $g(z_i)=\exp(z_i)/\Sigma_{k=1}^{c}\exp(z_k)$ may be used. For multi-label tasks, the sigmoid function $g(z_i)=1/(1+\exp(-z_i))$ is suitable.

Connecting the last unsupervised layer to the first supervised layer 64 can result in a much higher number of weights $W_1$ in this section than in all other layers of the architecture. Since this could be an issue for small datasets due to the higher risk of overfitting, the weights of this dimensionality reduction layer can be learned either with unsupervised learning (e.g., using PCA as in Perronnin 2015), or by learning a low-dimensional projection end-to-end with the next layers of the architecture.

For the supervised layers, 66, the standard cross-entropy is used between the network output $\hat{y}$ 68 and the corresponding ground-truth label vectors y as a loss function. For multi-class classification problems, the categorical cross-entropy cost function over all n samples is minimized by:

$$C_{cat}(y,\hat{y}) = -\Sigma_{i=1}^{n}\Sigma_{k=1}^{c} y_{ik} \log(\hat{y}_{ik}) \quad (1)$$

where c is the number of features (classes) in the vectors $\hat{y}, y$.

For multi-label problems the binary cross-entropy can minimized by:

$$C_{bin}(y,\hat{y}) = \Sigma_{i=1}^{n}\Sigma_{k=1}^{c} y_{ik} \log(\hat{y}_{ik}) - (1-y_{ik})\log(1-\hat{y}_{ik}) \quad (2)$$

For parameter optimization the Adam algorithm described in Kingma, et al., "A method for stochastic optimization," arXiv1412.6980, (December 2014), hereinafter, Kingma 2014, may be used. Since the Adam algorithm automatically computes individual adaptive learning rates for the different parameters of the model 66, this alleviates the need for fine-tuning of the learning rate with a costly grid-search or similar methods. Adam uses estimates of the first and second-order moments of the gradients in the update rule:

$$\theta_t \leftarrow \theta_{t-1} - \alpha\left(\frac{m_t}{(1-\beta_1^t)\left(\frac{\sqrt{(v_t)}}{1-\beta_2^t+\epsilon}\right)}\right) \quad (3)$$

where $g_t \leftarrow \nabla_\theta * f_t(\theta_{t-1})$
$m_t \leftarrow \beta_1 * m_{t-1} + (1-\beta_1) * g_t$
$v_t \leftarrow \beta_2 * v_{t-1} + (1-\beta_2) * g_t^2$
$f(\theta)$ is the function with parameters ($\theta$) to be optimized,
t is the index of the current iteration, $m_o=0$, $v_o=0$, and $\beta_1^t$ and $\beta_2^t$ denote $\beta_1$ and $\beta_2$ to the power of t, respectively.

The default values used for the parameters may be $\alpha=0.001$, $\beta_1=0.9$, $\beta_2=0.999$, and $\epsilon=10^{-8}$, for example.

Batch Normalization and Regularization

During learning, batch normalization (BN) (Ioffe, et al., "Batch normalization: Accelerating deep network training by reducing internal covariate shift," ICML, (2015) and Dropout (DO) (Srivastava, et al., "Dropout: A simple way to prevent neural networks from overfitting," J. Machine Learning Research 15, pp. 1929-1958 (2014)), may be used. Each BN layer is placed immediately before the ReLU non-linearity and parameterized by two vectors $\gamma$ and $\beta$ learned alongside each fully-connected layer. The transformation learned by BN for an input $x_i$ from a set of n training samples is given by:

$$BN(x_i; \gamma, \beta) = \gamma \frac{x_i + \mu_B}{\sqrt{\sigma_B^2 + \epsilon}} + \beta \quad (4)$$

where $$\mu_B \leftarrow \frac{1}{n}\sum_{j=1}^{n} x_i, \text{ and } \sigma_B^2 \leftarrow \frac{1}{n}\sum_{j=1}^{n}(x_j - \mu_B)^2$$

The operation performed by hidden layer j can then be expressed as $$h_j = r \odot g(BN(W_j h_{j-1}; \gamma_j, \beta_j))$$

where r is a vector of Bernoulli-distributed variables with probability p and $\odot$ denotes the element-wise product. The same drop-out rate p may be used for all layers. The last output layer is not affected by this modification.

Dimensionality Reduction Layer

When unsupervised, the weights of the dimensionality reduction layer 64 may be fixed from the projection matrices learned by PCA dimensionality reduction followed by whitening and $l_2$ normalization, as described in Perronnin 2015. When layer 64 is supervised, it is treated as the first fully-connected layer, to which batch normalization and dropout are applied, as with the rest of the supervised layers. An initialization strategy for the unsupervised case may be as follows:

A set of n mean-centered d-dimensional FVs for each trajectory sample in the training dataset is denoted as a matrix $X \in R^{d \times n}$. The goal of PCA projection is to find an r×d transformation matrix P, where r≤d, of the form Z=PX such that the rows of Z are uncorrelated, and therefore its d×d scatter matrix $S = Z Z^T$, where T is the transpose operator, is diagonal. In its primal form, this can be accomplished by the diagonalization of the d×d covariance matrix $X X^T$. However, when n<<d, it can become computationally inefficient to compute $X X^T$ explicitly. For this reason, the n×n Gram matrix $X^T X$ is diagonalized instead. By Eigen decomposition of $X^T X = V \Lambda V^T$, $P = V^T X^T \Lambda^{-1/2}$ can be obtained, which also diagonalizes the scatter matrix S, which is more efficient to compute (see Jégou, et al., "Aggregating local image descriptors into compact codes," T-PAMI 34, pp. 1704-1716 (2012) and Bishop, C. M., "Pattern Recognition and Machine Learning," (2006)).

To accommodate whitening, the weights of first reduction layer can be set to $$W_1 = V^T X^T \Lambda^{-1} \sqrt{n}$$

and kept fixed during training.

Bagging

Since the first unsupervised layers can be fixed, ensemble models can be trained and their predictions averaged efficiently for bagging purposes by caching the output of the unsupervised layers and reusing it in the subsequent models. See, for example, Maclin, et al., "An empirical evaluation of bagging and boosting," AAAI. (1997); Zhou, et al., Ensembling neural networks: Many could be better than all. Artificial Intelligence, 137 239-263 (2002); and Perronnin 2015.

It is emphasized that the foregoing are merely illustrative examples, and numerous variants are contemplated, such as using different or additional low level features, using different generative models in the unsupervised operations, omitting or modifying the dimensionality reduction, employing different non-linearities (i.e., different a transforms) in the hidden supervised layers and/or in the final supervised layer ($s_L$), or the like.

The method illustrated in FIGS. 3 and 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 30, (for example, an internal hard drive of RAM), or may be separate (for example, an external hard drive operatively connected with the computer 30), or may be separate and accessed via a digital data network such as a local area network (LAN) or the Internet (for example, as a redundant array of inexpensive or independent disks (RAID) or other network server storage that is indirectly accessed by the computer 12, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIGS. 3 and/or 4, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Without intending to limit the scope of the exemplary embodiment, the following examples illustrate applications of the exemplary method.

Examples

Five publicly available and common datasets for action recognition are used.

Hollywood2: This dataset contains 1,707 videos extracted from 69 Hollywood movies, distributed over 12 overlapping action classes. As one video can have multiple class labels, results are reported using the mean average precision (mAP). See, Marszalek, et al., "Actions in context," CVPR, (2009).

HMDB-SI: this dataset contains 6,849 videos distributed of 51 distinct action categories. Each class contains at least 101 videos and presents a high intra-class variability. The evaluation protocol is the average accuracy over three fixed splits (% mAcc). See, Kuehne, et al. "HMDB: a large video database for human motion recognition," ICCV, (2011).

UCF-101: This dataset contains 13,320 video clips distributed over 101 distinct classes. See, Soomro, et al. "UCF101: A dataset of 101 human actions classes from videos in the wild," arXiv:1212.0402 (December 2012). The performance is again measured as the average accuracy on three fixed splits. This is the same dataset used in the THUMOS' 13 challenge (Jiang, et al., "THUMOS Challenge: Action Recognition with a Large Number of Classes," (2013)).

Olympics: this dataset contains 783 videos of athletes performing 16 different sport actions, with 50 sequences per class. Some actions include interactions with objects, such as Throwing, Bowling, and Weightlifting. See, Niebles, et al., "Modeling temporal structure of decomposable motion segments for activity classification," ECCV, (2010). mAP over the train/test split released with the dataset is reported.

The High-Five (TVHI): this dataset contains 300 videos from 23 different TV shows distributed over four different human interactions and a negative (no-interaction) class. See, Patron-Perez, et al., "High Five: Recognising human interactions in TV shows," BMVC, (2010). mAP for the positive classes (mAP+) using the train/test split provided by the dataset authors is reported.

1. Unsupervised Models

The following unsupervised classification models were evaluated:

iDT: Improved Dense Trajectories (Wang, et al., "Action recognition with improved trajectories," ICCV. (2013) (Wang 2013-1.)

iDT+SFV+STP: iDT+Spatial Fisher Vector+Spatio-Temporal Pyramids. (Wang, et al., "A robust and efficient video representation for action recognition. IJCV, pp. 1-20 (July 2015), hereinafter, Wang 2015-1.

iDT+STA+DN: iDT+Spatio-Temporal Augmentation+Double-Normalization (Lan, et al., "Beyond Gaussian pyramid: Multi-skip feature stacking for action recognition," CVPR. (2015), hereinafter, Lan 2015.

iDT+STA+MIFS+DN: iDT+STA+Multi-skip Feature Stacking+DN (Lan 2015).

The following alternative combinations were also evaluated:

iDT+DN: Improved Dense Trajectories with Double-Normalization.

iDT+STA: Improved Dense Trajectories with Spatio-Temporal Augmentation.

iDT+STA+DAFS+DN: The exemplary method, Improved Dense Trajectories with Spatio-Temporal Augmentation, Data Augmentation Feature Stacking, and Double-Normalization. Seven different versions for each video are generated on-the-fly, considering the possible combinations of frame-skipping up to level 3 and horizontal flipping. The feature vectors (TRAJ, HOG, HOF, MBHx, and MBHy) generated from these different versions are aggregated, as described above Table 2 shows the results obtained with these models on different data sets. It should be noted that there are differences in the way in which the iDT approach is implemented in existing systems. Wang 2013-1 applies RootSIFT only on HOG, HOF, and MBH descriptors. In Lan 2015, this normalization is also applied to the Traj descriptor. Wang 2013-1 includes Traj descriptors, however Wang 2015-1 does not. Additionally, person bounding boxes are used to ignore human motions when doing camera motion compensation in Wang 2015 (to reproduce the existing method), but these are not publicly available for all datasets. Therefore, the baselines were repeated (denoted reproduction), and the present results are compared to the officially published ones. As shown in Table 2, the original iDT results from Vrigkas 2015 and Lan 2015 are successfully reproduced, as well as the MIFS results of Lan 2015.

TABLE 2

Analysis of iDT baseline methods and alternative combinations

|  | UCF-IOI % mAcc (s.d.) | HMDB-SI % mAcc (s.d.) | Holly-wood2 % mAP | TVHI % mAP + (s.d.) | Olympics % mAP |
|---|---|---|---|---|---|
| iDT | 84.8 *t | 57.2 | 64.3 | — | 91.1 |
| reproduction | 85.0 (1.32)*t | 57.0 (0.78) | 64.2 | 67.7 (1.90) | 88.6 |
| iDT + SFV + STP reproduction | 85.7*t 85.4 (1.27)*t | 60.1* 59.3 (0.80)* | 66.8* 67.1 * | 68.1 *t 67.8 (3.78)*t | 90.4* 88.3* |

TABLE 2-continued

Analysis of iDT baseline methods and alternative combinations

|  | UCF-IOI % mAcc (s.d.) | HMDB-SI % mAcc (s.d.) | Holly-wood2 % mAP | TVHI % mAP + (s.d.) | Olympics % mAP |
|---|---|---|---|---|---|
| iDT + STA + DN reproduction | 87.3 87.3 (0.96)t | 62.1 61.7 (0.90) | 67.0 66.8 | — 70.4 (1.63) | 89.8 90.7 |
| iDT + STA + MIFS + DN reproduction | 89.1 89.2 (1.03)t | 65.1 65.4 (0.46) | 68.0 67.1 | — 70.3 (1.84) | 91.4 91.1 |
| iDT + DN | 86.3 (0.95)t | 59.1 (0.45) | 65.7 | 67.5 (2.27) | 89.5 |
| iDT + STA | 86.0 (1.14)t | 60.3 (1.32) | 66.8 | 70.4 (1.96) | 88.2 |
| iDT + STA + DAFS + DN | 90.6 (0.91)t | 67.8 (0.22) | 69.1 | 71.0 (2.46) | 92.8 |

* without Trajectory descriptor
twithout Human Detector

Table 2 shows that double-normalization (DN) alone improves performance over iDT on most datasets, without the help of STA. STA gives comparable results to SFV+STP. Given that STA and DN are both beneficial for performance, they can be combined with the present method.

The exemplary method with Data Augmentation by Feature Stacking (DAFS) performed well on the unsupervised task. Although more sophisticated transformations can be used, combining a limited number of simple transformations, as here, shows significant improvements over the iDT-based methods, such as iDT+STA+DAFS+DN. The results for the exemplary method with DAFS are set as the shallow baseline (FV-SVM) and incorporated in the first unsupervised layers of the present hybrid models, as described below.

2. Hybrid Classification Models

Hybrid architectures with unsupervised dimensionality reduction learned by PCA provide a starting point. For UCF-IOI (the largest dataset) W1 is initialized with r=4096 dimensions, whereas for all other datasets the number of dimensions responsible for 99% of the variance (yielding less dimensions than training samples) is used. The interactions are studied between four parameters that can influence the performance of the hybrid models: the output dimension of the intermediate fully connected layers (width), the number of layers (depth), the dropout rate, and the mini-batch size of Adam (batch). All possible combinations are systematically evaluated, and the architectures are ranked by the average relative improvement with respect to the best FV-SVM model of Table 2. The top results are shown in Table 3.

TABLE 3

Top-5 best performing hybrid architectures with consistent improvements

| Depth | Width | Batch | UCF-101 % mAcc | HMDB-51 % mAcc | Hollywood2 % mAP | High-Five % mAP+ | Olympics % mAP | Relative Improv. |
|---|---|---|---|---|---|---|---|---|
| 2 | 4096 | 128 | 91.6 | 68.1 | 72.6 | 73.1 | 95.3 | 2.46% |
| 2 | 4096 | 256 | 91.6 | 67.8 | 72.5 | 72.9 | 95.3 | 2.27% |
| 2 | 2048 | 128 | 91.5 | 68.0 | 72.7 | 72.7 | 94.8 | 2.21% |
| 2 | 2048 | 256 | 91.4 | 67.9 | 72.7 | 72.5 | 95.0 | 2.18% |
| 2 | 512 | 128 | 91.0 | 67.4 | 73.0 | 72.4 | 95.3 | 2.05% |
| 1 | — | — | 91.9 | 68.5 | 70.4 | 71.9 | 93.5 | 1.28% |
| Best FV-SVM |  |  | 90.6 | 67.8 | 69.1 | 71.0 | 92.8 | 0.00% |

It can be seen that performing dimensionality reduction using the weight matrix from PCA is beneficial for all datasets, and using this layer alone, achieves 1.28% average improvement (Table 3, depth 1) over the best SVM baseline.

Width: Networks with fully connected layers of size 512, 1024, 2048, and 4096 were evaluated. A large width (4096) gives the best results in 4 of 5 datasets.

Depth: Hybrid architectures with depth between 1 and 4 were evaluated. Most well-performing models have a depth of 2 layers, but one layer is sufficient for the large datasets.

results further. Due to memory limitations imposed by the higher number of weights to be learned between the 116K dimensional input FV representation and the intermediate fully-connected layers, the maximum network width to 1024 is decreased. In spite of this limitation, the results in Table 4 show that much smaller hybrid architectures with supervised dimensionality reduction improve (on the larger UCF-IOI and HMDB-51 datasets) or maintain (on the other smaller datasets) recognition performance.

TABLE 4

Supervised dimensionality reduction hybrid architecture evaluation

| Depth | Width | Batch | UCF-101 % mAcc (s.d.) | HMDB-51 % mAcc (s.d.) | Hollywood2 % mAP | High-Five % mAP+ (s.d.) | Olympics % mAP |
|---|---|---|---|---|---|---|---|
| 1 | 1024 | 128 | 92.3 (0.77) | 69.4 (0.16) | 72.5 | 71.8 (1.37) | 95.2 |
| 1 | 512 | 128 | 92.3 (0.70) | 69.2 (0.09) | 72.2 | 72.2 (1.14) | 95.2 |
| 2 | 1024 | 128 | 91.9 (0.78) | 68.8 (0.46) | 71.8 | 72.0 (1.03) | 94.8 |
| 2 | 512 | 128 | 92.1 (0.68) | 69.1 (0.36) | 70.8 | 71.9 (2.22) | 94.2 |
| Best unsup. (Table 3) | | | 91.9 | 68.5 | 73.0 | 73.1 | 95.3 |

Dropout rate: Dropout rates from 0 to 0.9 were evaluated. Dropout is found to be dependent of both architecture and dataset. A high dropout rate significantly impairs classification results when combined with a small width and a large depth.

Mini-batch size: Mini-batch sizes of 128, 256, and 512 were evaluated. Lower batch sizes bring better results, with 128 being the most consistent across all datasets. Larger batch sizes were found to be detrimental to networks with a small width.

Best configuration with unsupervised dimensionality reduction: The following parameters were found to work the best: small batch sizes, a large width, moderate depth, and dataset-dependent dropout rates. The most consistent improvements across datasets are with a network with batch-size 128, width 4096, and depth 2. This architecture was selected for subsequent evaluations.

Supervised dimensionality reduction: Here, the dimensionality reduction layer can have a large influence on the overall classification results (see Table 3, depth 1). A supervised dimensionality reduction layer trained end-to-end with the rest of the architecture could be expected to improve 3. Transferability of Hybrid Models In this evaluation, the first layers of the architecture are transferred across datasets. As a reference point, the first split of UCF-101 is used to create a base model and elements from it are transferred to other datasets. UCF-101 is selected because it is the largest dataset, has the largest diversity in number of actions, and contains multiple categories of actions, including human-object interaction, human-human interaction, body-motion interaction, and practicing sports. Results are shown in Table 5.

TABLE 5

Transferability experiments involving unsupervised dimensionality reduction

| Representation Layers | Reduction Layers | Supervised Layers | HMDB-51 % mAcc (s.d.) | Hollywood2 % mAP | High-Five % mAP+ (s.d.) | Olympics % mAP |
|---|---|---|---|---|---|---|
| own | own | own | 68.0 (0.65) | 72.6 | 73.1 (1.01) | 95.3 |
| UCF | own | own | 68.0 (0.40) | 72.4 | 73.7 (1.76) | 94.2 |
| UCF | UCF | Own | 66.5 (0.88) | 70.0 | 76.3 (0.96) | 94.0 |
| UCF | UCF | UCF | 66.8 (0.36) | 69.7 | 71.8 (0.12) | 96.0 |

Unsupervised Representation Layers.

The dataset-specific GMMs are replaced with the GMMs from the base model. The results in the second row of Table 5 show that the transferred GMMs give similar performance to the ones using dataset-specific GMMs. This, therefore, greatly simplifies the task of learning a new model for a new dataset. The transferred GMMs are fixed in subsequent experiments.

Unsupervised Dimensionality Reduction Layer.

Instead of configuring the unsupervised dimensionality reduction layer with weights from the PCA learned on its own dataset (own), it is configured with the weights learned in UCF-101. These results are shown in the third row of Table 5. This time, a different behavior is observed: for Hollywood2 and HMDB-51, the best models were found without transfer, whereas for Olympics it did not have any measurable impact. However, transferring PCA weights brings significant improvement in High-Five. One of the reasons for this improvement is the evidently smaller training set size of High-Five (150 samples) in contrast to other datasets. The fact that the improvement becomes less visible as the number of samples in each dataset increases (before eventually degrading performance) indicates that there is a threshold below which transferring starts to be beneficial (around a few hundred training videos).

Supervised Layers after Unsupervised Reduction.

The transferability of further layers in the architecture was studied after the unsupervised dimensionality reduction transfer. The base model learned in the first split of UCF-101 has its last classification layer removed, a classification layer with the same number of classes is re-inserted as the target dataset, and this new model is fine-tuned in the target dataset, using an order of magnitude lower learning rate. The results can be seen in the last row of Table 5. The same behavior is observed for HMDB-51 and Hollywood2. However, a decrease in performance for High-Five and a performance increase for Olympics is shown. This is attributed to the presence of many sports-related classes in UCF-101.

End-to-End Reduction and Supervised Layers.

An evaluation of whether the architecture with supervised dimensionality reduction layer transfers across datasets was performed, as for the unsupervised layers. Again the last classification layer is replaced from the corresponding model learned on the first split of UCF-101, and the whole architecture is fine-tuned on the target dataset. The results in the second and third rows of Table 6 shows that transferring this architecture brings improvements for Olympics and HMDB-51, but performs worse than transferring unsupervised layers only on High-Five.

TABLE 6

Transferability experiments involving supervised dimensionality reduction

| Representation Layers | Supervised Layers | HMDB-51 % mAcc (s.d.) | Hollywood2 % mAP | High-Five % mAP+ (s.d.) | Olympics % mAP |
|---|---|---|---|---|---|
| own | own | 69.2 (0.09) | 72.2 | 72.2 (1.14) | 95.2 |
| UCF | own | 69.4 (0.16) | 72.5 | 71.8 (1.37) | 95.2 |
| UCF | UCF | 69.6 (0.36) | 72.2 | 73.2 (1.89) | 96.3 |

Best Models.

For UCF-101, the most effective model leverages its large training set using supervised dimensionality reduction (Table 4). For HMDB-51 and Olympics datasets, the best models result from transferring the supervised dimensionality reduction models from the related UCF-101 dataset (Table 6). Due to its specificity, the best architecture for Hollywood2 is based on unsupervised dimensionality reduction learned on its own data (Table 3), although there are similarly-performing end-to-end transferred models (Table 6). For High-Five, the best model is obtained by transferring the unsupervised dimensionality reduction models from UCF-101 (cf Table 5).

Bagging.

The best models are taken and bagging is performed with 8 models initialized with distinct random initializations. This improves results by around one point on average, and the final results are shown in Table 7.

The following models were compared:
Handcrafted:
  iDT+FV: Wang 2013.
  SDT-ATEP: Gaidon, et al., "Activity representation with motion hierarchies," IJCV 107, pp. 219-238, (2014).
  iDT+FM: Peng, et al., "Bag of visual words and fusion methods for action recognition: Comprehensive study and good practice," arXiv1405.4506 (May 2014)
  iDT+SFV+STP: Wang 2015.
  RCS: Hoai, et al. "Improving human action recognition using score distribution and ranking," ACCV, (2014), hereinafter, Hoai 2014
  iDT+MIFS: Lan 2015.
  VideoDarwin: Fernando, et al., "Modeling video evolution for action recognition," CVPR. (2015), hereinafter Fernando 2015.
  VideoDarwin+HF+iDT:Fernando 2015.
Deep-Network Based:
  2S-CNN: Simonyan, et al., "Two-stream convolutional networks for action recognition in videos," NIPS (2014).
  2S-CNN+Pool: Ng, et al., "Beyond short snippets: Deep networks for video classification," CVPR, (2015), hereinafter, Ng 2015.
  2S-CNN+LSTM: Ng 2015.
  Objects+Motion(R*): Jain, et al., "What do 15,000 object categories tell us about classifying and localizing actions?," CVPR, (2015), hereinafter, Jain 2015.
  Comp-LSTM: Srivastava, et al., "Unsupervised learning of video representations using LSTMs," arXiv:1502.04681, (March 2015), hereinafter, Srivastava 2015.
  C3D+SVM: Tran, et al., "Learning spatiotemporal features with 3D convolutional networks," CVPR (2014).
  FSTCN: Sun, et al., "Human action recognition using factorized spatio-temporal convolutional networks," ICCV (2015)
Hybrid:
  iDT+StackFV: Peng, et al., "Action recognition with stacked Fisher vectors," ECCV (2014).
  TDD: Wang, et al., "Action recognition with trajectory-pooled deep-convolutional descriptors," CVPR. (2015), hereinafter Wang 2015-2.
  TDD+iDT: Wang 2015-2.
  CNN-hid6+iDT: Zha, et al., "Exploiting image-trained CNN architectures for unconstrained video classification, BMVC. (2015).
  C3D+iDT+SVM: Tran, et al., Learning spatiotemporal features with 3D convolutional networks," CVPR. (2014).

The results are shown in Table 7. Methods are organized by category and sorted in chronological order in each block.

TABLE 7

Comparison of the exemplary method with other models for action recognition

| Method | UCF-101 % mAcc (s.d.) | HMDB-51 % mAcc (s.d.) | Hollywood2 % mAP | High-Five % mAP+ (s.d.) | Olympics % mAP |
|---|---|---|---|---|---|
| Handcrafted | | | | | |
| iDT + FV | 84.8 | 57.2 | 64.3 | — | 91.1 |
| SDT-ATEP | — | 41.3 | 54.4 | 62.4 | 85.5 |

TABLE 7-continued

Comparison of the exemplary method with other models for action recognition

| Method | UCF-101 % mAcc (s.d.) | HMDB-51 % mAcc (s.d.) | Holly-wood2 % mAP | High-Five % mAP+ (s.d.) | Olympics % mAP |
|---|---|---|---|---|---|
| iDT + FM | 87.9 | 61.1 | — | — | — |
| RCS | — | — | 73.6 | 71.1 | — |
| iDT + SFV + STP | 86.0 | 60.1 | 66.8 | 69.4 | 90.4 |
| iDT + MIFS | 89.1 | 65.1 | 68.0 | — | 91.4 |
| VideoDarwin | — | 61.6 | 69.6 | — | — |
| VideoDarwin + HF + iDT | — | 63.7 | 73.7 | — | — |
| Deep-Based | | | | | |
| 23-CNN $^{IN}$ | 88.0 | 59.4 | — | — | — |
| 2S-CNN + Pool $^{IN}$ | 88.2 | — | — | — | — |
| 2S-CNN + LSTM $^{IN}$ | 88.6 | — | — | — | — |
| Objects + Motion(R*) $^{IN}$ | 88.5 | 61.4 | 66.4 | — | — |
| Comp-LSTM $^{ID}$ | 84.3 | 44.0 | — | — | — |
| C3D + SVM $^{SIM,ID}$ | 85.2 | — | — | — | — |
| FSTCN $^{IN}$ | 88.1 | 59.1 | — | — | — |
| Hybrid | | | | | |
| iDT + StackFV | — | 66.8 | — | — | — |
| TDD $^{IN}$ | 90.3 | 63.2 | — | — | — |
| TDD + IDT $^{IN}$ | 91.5 | 65.9 | — | — | — |
| CNN-hid6 + iDT $^{SIM}$ | 89.6 | — | — | — | — |
| C3D + iDT + SIM $^{ID}$ | 90.4 | — | — | — | — |
| Best of above | 91.5 (TDD) | 66.8 (iDT + StackFV) | 73.7 (Video Darwin) | 71.1 {RCS} | 91.4 (iDT + MIFS) |
| Present best FV + SVM | 90.6 (0.91) | 67.8 (0.22) | 69.1 | 71.0 (2.46) | 92.8 |
| Present best hybrid | 92.5 (0.73) | 70.4 (0.97) | 72.6 | 76.7 (0.39) | 96.7 |

$^{SIM}$ indicates the model or parts of the model have been trained using the large Sports-1M dataset,
$^{IN}$ indicates the model or parts of the model have been trained in the large ImageNet dataset, and
$^{ID}$ indicates the model or parts of the model have been trained on proprietary datasets.

$^{SIM}$ indicates the model or parts of the model have been trained using the large Sports-1M dataset, $^{IN}$ indicates the model or parts of the model have been trained in the large ImageNet dataset, and $^{ID}$ indicates the model or parts of the model have been trained on proprietary datasets.

Hybrid models improve upon the other methods, and handcrafted-shallow FV-SVM improves upon competing end-to-end architectures relying on external data sources (Tran 2014 pre-trains models on an internal 1380K dataset; Comp-LSTM uses an additional 300 h of unrelated Youtube videos).

The exemplary hybrid models outperform the existing methods, including methods trained on massive labeled datasets like ImageNet or Sports-1M. This confirms both the excellent performance and the data efficiency of the exemplary system. Compared to existing approaches, the exemplary hybrid models are (i) data efficient, as they require a smaller number of training samples to achieve state-of-the-art performance, (ii) transferable across datasets, meaning existing models can be fine-tuned in new action datasets leading to both shorter training times and higher performance rates.

Figure 5:
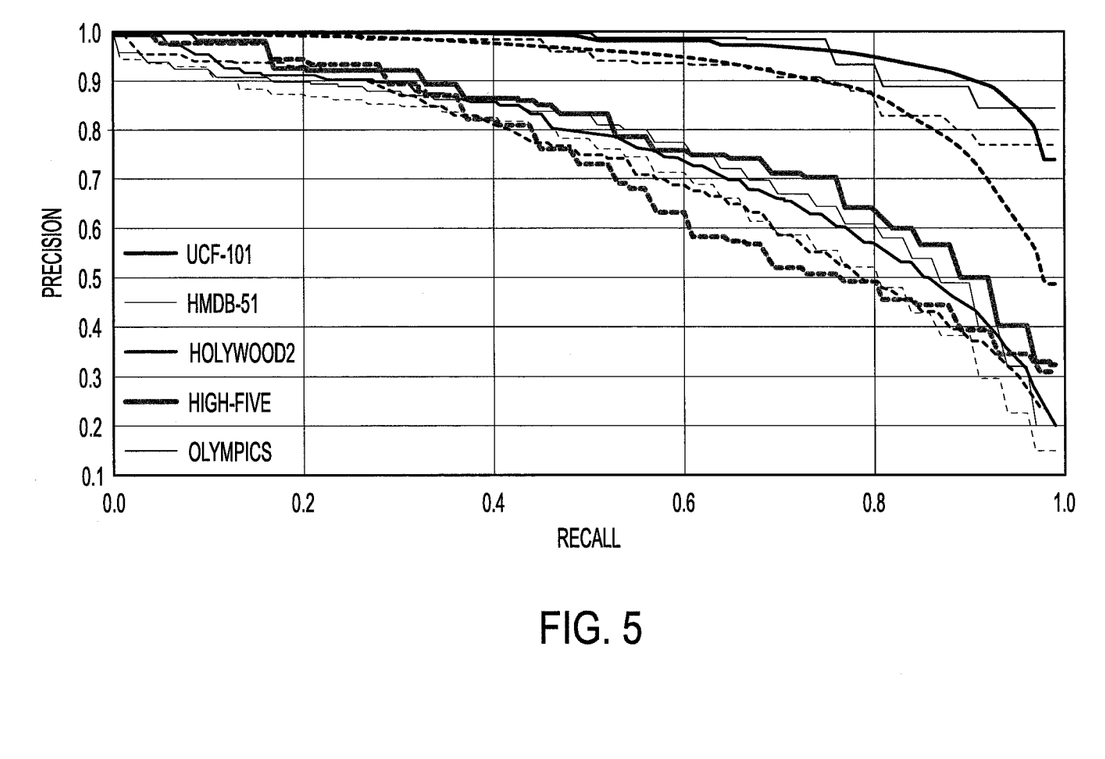
FIG. 5 shows Precision vs Recall for the hybrid classification system using different datasets.

FIG. 5 shows Precision vs Recall for the exemplary method (solid lines) and best of the other methods (dashed lines) using the different datasets. The exemplary method leads to substantial improvements for all datasets considered.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A video classification method comprising:
with at least one processor of one or more computing devices:
receiving an input video comprising a sequence of frames;
generating at least one transformation of the input video, each transformation comprising a sequence of frames;
for the input video and each transformation, extracting local descriptors from the respective sequence of frames;
aggregating the local descriptors of the input video and each transformation to form an aggregated feature vector with a first set of processing layers learned using unsupervised learning; and
generating an output classification value for the input video based on the aggregated feature vector with a second set of processing layers learned using supervised learning.

2. The method of claim 1, wherein the second set of processing layers comprises a neural network.

3. The method of claim 2, wherein at least one the second set of processing layers performs a linear vector projection and a non-linear vector transformation.

4. The method of claim 1, wherein the at least one transformation comprises a plurality of transformations.

5. The method of claim 1, wherein the at least one transformation comprises at least one of:
repeating frames of the input video,
skipping frames of the input video,
color modifications to the input video;
affine transformations of frames of the input video; and
projective transformations of frames of the input video.

6. The method of claim 5, wherein the at least transformation comprises at least two of:
repeating frames of the input video,
skipping frames of the input video,
color modifications to the input video;
affine transformations of frames of the input video; and
projective transformations of frames of the input video.

7. The method of claim 1, wherein the extracting of local descriptors comprises:
sampling the local descriptors along an optical flow trajectory identified from the plurality of frames.

8. The method of claim 1, wherein the generating of the aggregated feature vector comprises, for each of the input video and each transformation, generating a respective feature vector based on the respective local descriptors and aggregating the feature vectors.

9. The method of claim 1, wherein the extracting local descriptors comprises:
extracting a plurality of spatio-temporal features from the at least one transformation of the input video;
the aggregating of the local descriptors comprising:
stacking the extracted spatio-temporal features into a matrix;
encoding the matrix;

pooling the encodings of the matrix to generate an encoding vector; and normalizing the encoding vector to obtain a single aggregated feature vector.

10. The method of claim 1, wherein the aggregating of the local descriptors comprises:

encoding the local descriptors extracted from each transformation using a generative model; and;

aggregating the encoded local descriptors.

11. The method of claim 10, wherein the encoding of the local descriptors comprises encoding the local descriptors extracted from the sequence of frames using a Fisher vector encoding.

12. The method of claim 1, further comprising:

with one of the at least one processors, projecting the aggregating feature vector into a space of lower dimensionality than the dimensionality of the aggregating feature vector to produce an aggregated feature vector of lower dimensionality prior to generating the output classification value.

13. The method of claim 1, further comprising, with one of the at least one processors, training the second sequence of layers comprising:

for each training video of a set of training videos, generating a training video aggregated feature vector representing the training video with the first set of processing layers; and training the second sequence of layers on a training set comprising the generated training video feature vectors annotated by labels of the represented training videos.

14. The method of claim 13, wherein the first layers are trained without using the labels of the set of training videos.

15. The method of claim 1, further comprising, with one of the at least one processors, outputting at least one of the classification value and information generated therefrom.

16. The method of claim 1, wherein the classification value comprises a vector of classification values.

17. A computer program product comprising a non-transitory recording medium storing instructions, which when executed on a computer, causes the computer to perform a method comprising:

receiving an input video comprising a sequence of frames;

generating at least one transformation of the input video, each transformation comprising a sequence of frames;

for the input video and each transformation, extracting local descriptors from the respective sequence of frames;

aggregating the local descriptors of the input video and each transformation to form an aggregated feature vector with a first set of processing layers learned using unsupervised learning; and generating an output classification value for the input video based on the aggregated feature vector with a second set of processing layers learned using supervised learning.

18. A system comprising memory which stores instructions for performing a method and a processor in communication with the memory for executing the instructions, the method comprising:

receiving an input video comprising a sequence of frames;

generating at least one transformation of the input video, each transformation comprising a sequence of frames;

for the input video and each transformation, extracting local descriptors from the respective sequence of frames;

aggregating the local descriptors of the input video and each transformation to form an aggregated feature vector with a first set of processing layers learned using unsupervised learning; and generating an output classification value for the input video based on the aggregated feature vector with a second set of processing layers learned using supervised learning.

19. A video classification system comprising:

a transformation generator which generates at least one transformation of an input video comprising a sequence of frames, each transformation comprising a sequence of frames;

a feature vector generator which, for the input video and each transformation, extracts local descriptors from the respective sequence of frames and aggregates the local descriptors of the input video and each transformation to form an aggregated feature vector with a first set of processing layers learned using unsupervised learning; and a classifier component which generates an output classification value for the input video based on the aggregated feature vector with a second set of processing layers learned using supervised learning; and a hardware processor which implements the transformation generator, feature vector generator and classifier component.

20. The system of claim 19, further comprising an output component, implemented by the hardware processor, which outputs at least one of the classification value and information based thereon.

21. The system of claim 19, wherein the at least one transformation comprises a plurality of transformations.

22. A method for classifying a video, the method comprising:

with at least one processor of one or more computing devices:

receiving an input video;

generating a plurality of transformations of the input video;

for each transformation, generating a feature vector representing the transformation, the generating comprising, for a plurality of frames of the transformation:

extracting local descriptors from the plurality of frames of the transformation of the input video;

extracting a plurality of spatio-temporal features from the plurality of transformations of the input video;

stacking the extracted spatio-temporal features into a matrix;

encoding the matrix;

pooling the encodings of the matrix to generate an encoding vector; and normalizing the encoding vector;

aggregating the generated feature vectors of the input video and at least one of the transformations, and the encoding vector to form an aggregated feature vector; and with a trained classifier, generating an output classification value for the input video based on the aggregated feature vector.

* * * * *